United States Patent
Sikand et al.

(10) Patent No.: US 10,491,476 B2
(45) Date of Patent: Nov. 26, 2019

(54) EXTENDING A VIRTUAL LOCAL AREA NETWORK ACROSS A LAYER 2 DATA CENTER INTERCONNECT

(71) Applicant: Cisco Technology, Inc., San Jose, CA (US)

(72) Inventors: Vrishab Sikand, Lexington, MA (US); Liqin Dong, San Jose, CA (US); Lukas Krattiger, Pleasanton, CA (US); Lifen Tian, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 206 days.

(21) Appl. No.: 15/683,196

(22) Filed: Aug. 22, 2017

(65) Prior Publication Data
US 2019/0068449 A1 Feb. 28, 2019

(51) Int. Cl.
*H04L 12/24* (2006.01)
*H04L 12/46* (2006.01)

(52) U.S. Cl.
CPC ...... *H04L 41/0886* (2013.01); *H04L 12/4641* (2013.01); *H04L 41/0809* (2013.01); *H04L 41/0853* (2013.01); *H04L 41/22* (2013.01)

(58) Field of Classification Search
CPC ... H04L 12/4641; H04L 61/103; H04L 49/70; H04L 61/6022; H04L 29/12028; H04L 45/66
See application file for complete search history.

(56) References Cited

U.S. PATENT DOCUMENTS

| | | | |
|---|---|---|---|
| 8,976,792 B2 | 3/2015 | Patel et al. | |
| 9,264,305 B2 | 2/2016 | Zhou et al. | |
| 9,544,219 B2 | 1/2017 | Chong et al. | |
| 9,716,628 B2 | 7/2017 | Sikand et al. | |
| 2011/0149980 A1* | 6/2011 | Patel | H04L 12/4641 370/401 |
| 2011/0317703 A1* | 12/2011 | Dunbar | H04L 12/462 370/392 |
| 2012/0147894 A1* | 6/2012 | Mulligan | G06F 9/45533 370/395.53 |

(Continued)

OTHER PUBLICATIONS

"Cisco Nexus 6000 Series NX-OS Layer 2 Switching Configuration Guide, Release 7.x," cisco.com, accessed on Jul. 28, 2017, updated Jul. 6, 2017, pp. 1-22.

*Primary Examiner* — Romani Ohri
(74) *Attorney, Agent, or Firm* — Polsinelli PC

(57) ABSTRACT

The present disclosure involves systems and methods for automating interconnecting or stitching disparate Layer 2 domains across data center interconnects without the need to renumber virtual local area networks (VLANs) within an existing network. The interconnected networks may allow components or virtual machines, such as containers, within the connected networks or data centers to exchange Layer 2 communications while the connected VLANs or fabrics retain existing VLAN identification numbers to minimize alterations made to the data center networks. Further, the process of interconnecting the data centers may be automated such that administrators of the networks may provide an indication of interconnecting the data center networks without the need to manually access and configure edge devices of the networks to facilitate the Layer 2 communication.

20 Claims, 6 Drawing Sheets

(56) References Cited

U.S. PATENT DOCUMENTS

| | | | |
|---|---|---|---|
| 2013/0308637 A1* | 11/2013 | Han | H04L 12/4633 |
| | | | 370/390 |
| 2014/0169368 A1* | 6/2014 | Grover | H04L 45/745 |
| | | | 370/392 |
| 2014/0215036 A1* | 7/2014 | Elzur | H04L 49/50 |
| | | | 709/223 |
| 2015/0092785 A1* | 4/2015 | Torvi | H04L 45/04 |
| | | | 370/401 |
| 2015/0222543 A1* | 8/2015 | Song | H04L 12/4641 |
| | | | 370/392 |
| 2017/0078216 A1* | 3/2017 | Adolph | H04L 12/4641 |
| 2017/0171056 A1* | 6/2017 | Dong | H04L 12/4641 |

* cited by examiner

EXTENDING A VIRTUAL LOCAL AREA NETWORK ACROSS A LAYER 2 DATA CENTER INTERCONNECT

TECHNICAL FIELD

The present disclosure relates generally to extending layer 2 connectivity across multiple data centers, and more specifically, to an automated approach to stitching disparate Layer 2 domains across data center interconnects without the need to renumber virtual local area networks within an existing network.

BACKGROUND

As data center or enterprise networking customers grow larger and larger through an increase in market share or through mergers and acquisitions of other entities, the need to manage the customer's information technology (IT) and networking infrastructure becomes more complex and difficult. In particular, enterprise customers will often maintain a data center or multiple data centers by creating a virtual local area network (VLAN). Through the VLAN, virtual machines (VMs) or containers may be established within the network to facilitate communication between components of the sites or data centers. However, aggregating additional VLANs with an existing site (such as through a merger or acquisition of another business that operate their own individual network) may create a logistical challenge to the IT specialists of the enterprise customer. This problem increases many fold when virtualization techniques like containers are deployed by the organizations within the network sites or VLANs.

For mid to large size enterprise customers, operations are much simplified if each site can be managed separately and coordination is only needed at the boundary of the network for the VLANs that need to communicate with each other. This improves scale, reduces cost of operations, and creates smaller failure domains. As companies grow by acquisitions and interconnected sites, they also run into issues of VLAN shortage and/or VLAN overlap. All these problems are expounded if they have multiple sites. It is more efficient for the organization if the current VLAN allocations are retained and each site has its own independent VLAN space.

In many instances, applications running on an enterprise network across multiple sites or locations utilize Layer 2 connections or communications between the sites to function. To stitch enterprise networks together at a Layer 2 level is typically done through manual data center interconnect techniques. In other words, network administrators or IT specialists access components of each enterprise network to be stitched and configure one or more of the components in an attempt to allow the enterprise networks to communicate. This manual configuration of the networks has quickly become more complex and difficult as such networks continue to expand. The introduction of virtual machines and containers within the networks add another level of complexity to the data center interconnection, to the point of becoming unmanageable.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
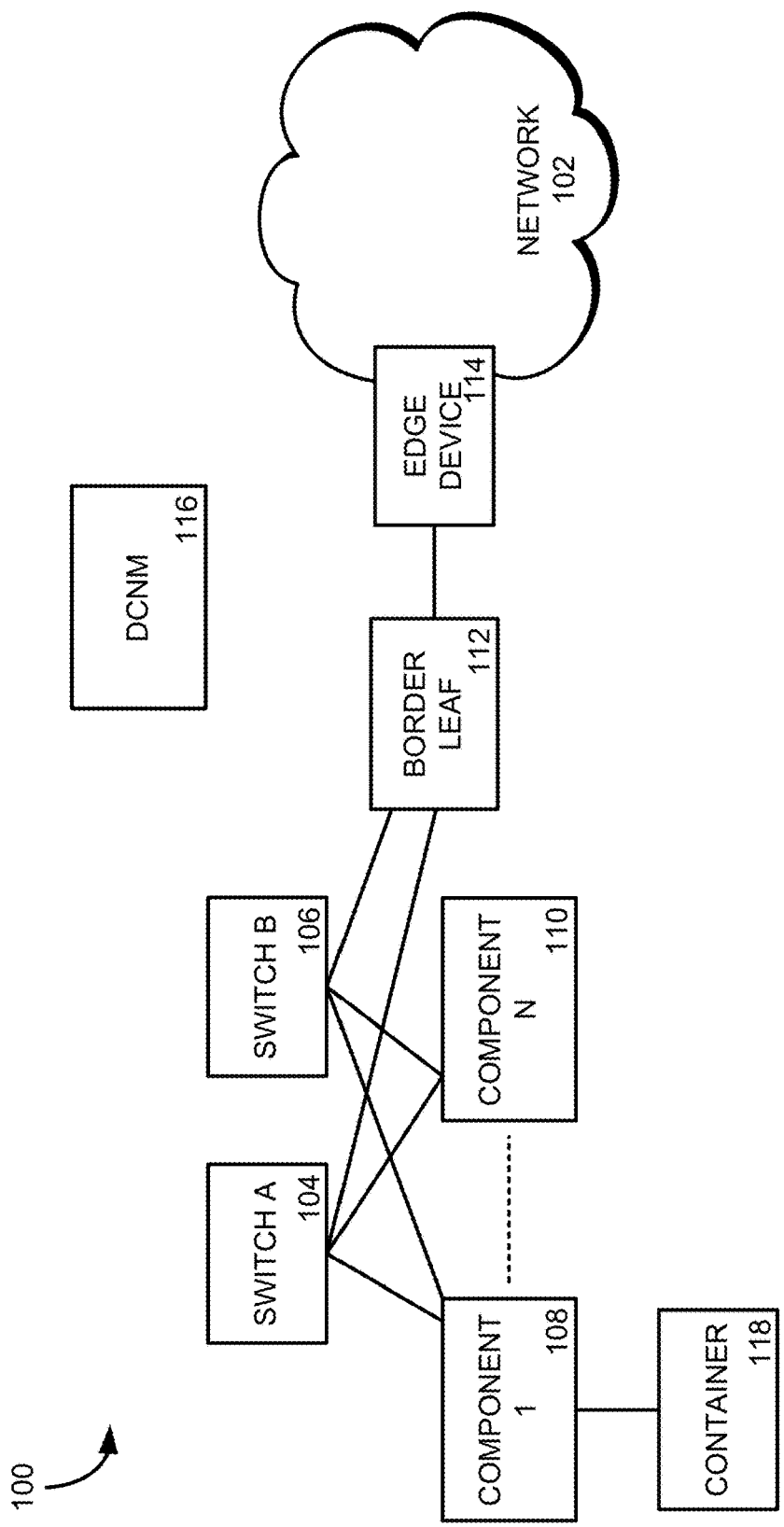
FIG. 1 is a system diagram for a data center network or site, in accordance with various embodiments of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

A system, network device, method, and computer readable storage medium is disclosed for extending a Layer 2 network between two or more fabric networks. The system may include devices to perform operations to extend the Layer 2 network. Such operations may include receiving a request to connect a first fabric network to a second fabric network over a network through a Layer 2 interconnect, wherein the first data center utilizes a first Virtual Local Area Network (VLAN) identifier and the second data center utilizing a second VLAN identifier different than the first VLAN identifier and obtaining a Data Center Interconnect (DCI) identifier, the DCI identifier unique to an interconnection between the first fabric network and the second fabric network. Further, the system may automatically generate a first configuration profile to at least one border networking device of the first fabric network based on the received request, the first configuration profile to configure the at least one border networking device of the first fabric network to map the DCI identifier to the first VLAN identifier and to include the DCI identifier in a Layer 2 transmission protocol portion of a first plurality of communication packets intended for the second fabric network. Similarly, the system may automatically generate a second configuration profile to at least one border networking device of the second fabric network to configure the at least one border networking device of the second fabric network to map the DCI identifier to the second VLAN identifier and to include the DCI identifier in a Layer 2 transmission protocol portion of a second plurality of communication packets intended for the first fabric network.

In one implementation, the Layer 2 transmission protocol utilized by the system may be an Overlay Transport Virtualization (OTV) protocol and the DCI identifier is included in an OTV packet from the first fabric network to the second fabric network. In this implementation, the DCI identifier is utilized as an OTV transport VLAN and included in a data plane of the OTV packet. In another implementation, the Layer 2 transmission protocol may be a Virtual Private Local Area Network (LAN) Service (VPLS) transport protocol and the DCI identifier may be utilized as a VPLS Virtual Private Network (VPN) identifier carried in a VPLS VPN control plane.

Further still, in some instances the DCI identifier is obtained from an input provided through a user interface executed on an orchestrator device in communication with the first fabric network and the second fabric network. The user interface may be displayed on a display device connected to a network device. In addition to receiving the DCI identifier, the user interface may also receive the request to connect the first fabric network to the second fabric network over a network through the Layer 2 interconnect and/or display network information of the first fabric network and the second fabric network.

In another implementation, the DCI identifier may be obtained from a central database storing a plurality of DCI identifiers with each of the plurality of DCI identifiers associated with a corresponding data center interconnect.

EXAMPLE EMBODIMENTS

Aspects of the present disclosure involve systems and methods for automating interconnecting or stitching disparate Layer 2 domains across data center interconnects without the need to renumber virtual local area networks (VLANs) within an existing network. The interconnected networks may allow components or virtual machines, such as containers, within the connected networks or data centers to exchange Layer 2 communications while the connected VLANs or fabrics retain existing VLAN identification numbers to minimize alterations made to the data center networks. Further, the process of interconnecting the data centers may be automated such that administrators of the networks may provide an indication of interconnecting the data center networks without the need to manually access and configure edge devices of the networks to facilitate the Layer 2 communication. In this manner, customers with ever-changing enterprise networks that may include several virtual machines (VMs) and/or containers may interconnect several sites or data centers seamlessly and automatically without the complex task of manually configuring multiple network devices within the enterprise.

In one particular embodiment, a network orchestrator is provided to an administrator of a data center network. Through the orchestrator, the administrator may indicate adding an additional network to an existing data center network or the stitching together to two or more such data center networks. The orchestrator may, in turn, determine a particular interconnect identification value or other identifying characteristic for the Layer 2 interconnecting of the data centers. This interconnection identification value may be referred to as a data center interconnection (DCI) identifier and may be utilized by the orchestrator to provide a normalization value or abstract layer for Layer 2 interconnecting the fabrics of the various sites or data centers of the enterprise customer. In one example, the DCI identifier is selected by the enterprise administrator for use in Layer 2 interconnecting all or some of the various fabrics of the enterprise network. In another example, the DCI identifier is generated by the orchestrator and provided to the administrator for such use.

The orchestrator may also connect to or otherwise communicate with other control devices to begin configuring components of the data center networks for interconnecting the networks. For example, a data center network manager (DCNM) device may be associated with a fabric network of a data center. The orchestrator may provide one or more command line interface (CLI) instructions to the DCNM to configure one or more of the fabric components with the DCI identifier. In some embodiments, the orchestrator may utilize one or more application programming interfaces (APIs) to communicate with the DCNM device. Upon receiving the instructions, the DCNM may access one or more components of the data center fabric to configure the components to extend Layer 2 communication into the fabric with the DCI identifier. The communication with the DCNM may occur for any number of fabrics that are to be stitched together by the orchestrator of the enterprise network. Once the components of the fabrics are configured such that the Layer 2 is extended into the fabrics, Layer 2 communications may occur between the fabrics.

By creating a new abstraction layer for the Layer 2 interconnect between the data center networks, the use of the DCI identifier may be Layer 2 transport protocol agnostic. In other words, regardless of if the data center fabrics utilize overlay transport virtualization (OTV) transport protocol, virtual private LAN service transport protocol, Ethernet transport protocol, and the like, the DCI identifier may be mapped to the particular transport protocol for the data center fabric for use in Layer 2 interconnection of the data center fabrics. This further prevents an administrator of the networks to needing to by aware of the various transport protocols and manually mapping the various protocols together within the Layer 2 interconnect.

Through the presented automated solution to stitch disparate Layer 2 domains across any data center interconnect network without the need to renumber VLANs within existing networks or fabrics, improvements in the efficiency of connecting networks is provided. This is especially provided in networks that grow in size quickly due to the use of containers and VMs or in businesses where companies are constantly mergers, acquiring others companies, expanding or providing servers to multitude of tenants who have elastic needs. Further, as the solution is based on central orchestrator, it can be rapidly evolved or scaled to meet additional demands on the customer network with little to no switch side changes within the network fabrics.

FIG. 1 is a system diagram for a data center network or site, in accordance with various embodiments of the subject technology. The network 100 illustrated is but one example of switch fabric network that may be incorporated or included in an enterprise network for a customer. In one particular embodiment, the network 100 may be considered a data center network for performing any number of compute and communication functions. Further, the components of the network 100 may be virtualized such that functions of the components are executed by any number of network devices. Also in one implementation, the fabric network 100 may represent a VLAN-type network within a larger enterprise network that governs communications between the components of the network.

In general, the fabric network 100 may include one or more switches or switching devices 104, 106. The switches 104, 106 facilitate the exchange of communications between components of the fabric 100. As such, switches 104, 106 may connect to or otherwise be in communication with compute, storage, or networking components 108-110 of the network 100. In general, the network components 108-110 may be configured to perform any function as designed or intended by an administrator of the network 100. Connected or otherwise in communication with the compute or storage components 108-110 may be a host or other container 118 embodied within the fabric network 100 for communication or use of the network.

The switch fabric network 100 may also include one or more border leaf nodes 112 in communication with the switches 104, 106 of the network 100. The border leaf nodes 112 are network nodes that reside on the border of subnetworks to facilitate communication with other networks. For example, border leaf node 1112 may map Layer 2 information received from an edge device 114 to a VLAN identifier utilized by the switches 104, 106 of the fabric network for transmitting the received communications. In general, the border leaf node 112 provides the interface of the VLAN-based components to a larger external network or interconnect 102.

To receive communications from the external network or interconnect 102, the border leaf node 112 may communicate or be connected to a data center edge device 114. Although only a single VLAN configuration is illustrated in the network 100 of FIG. 1 as connected to the edge device 114, it should be appreciated that any number of VLAN networks and associated border leaf nodes may communicate with edge device 114 for transmitting and receiving communications from network 102. As such, network 102 may be any type of network that provides communications between disparate devices or network components. In one example, the network 102 may be an Internet Protocol (IP)-based telecommunications network that connects several edge devices behind which any number of VLANs may be accessible by other VLANs to create a network of interconnected fabrics or data centers. In one particular example, the interconnected data centers may be associated with a particular enterprise customer that shares information and data between the sites across the network 102 and through corresponding edge devices 114 and border leaf nodes 112.

Also included in network 100 is a DCNM 116 device. In general, the DCNM 116 communicates with and configures the components of the data center network or otherwise manages the operations of the fabric network. In one implementation, a network user may access the DCNM 116 to configure the various components and functions of the network 100 as desired by the network administrator. As such, the DCNM 116 may translate one or more received instructions for configuring the network 100 and communicate with one or more components of the network to facilitate or execute the instructions.

As mentioned above, different VLANs or fabrics may be interconnected to allow communications between the networks. For example, a business may operate a VLAN to support the operations of the business, such as marketing, human resources, payroll, etc. Each department in the business may be established as a separate VLAN or VM in this scenario. In other implementations, a business utilizing a VLAN may merge or acquire another business with a separate VLAN or group of VLANs. Stitching together VLANs may quickly become cumbersome and complex as the size of the enterprise network of the business grows. Providing Layer 2 communication between two or more various VLANs or fabrics may be particularly difficult for network administrators to accomplish.

Figure 2:
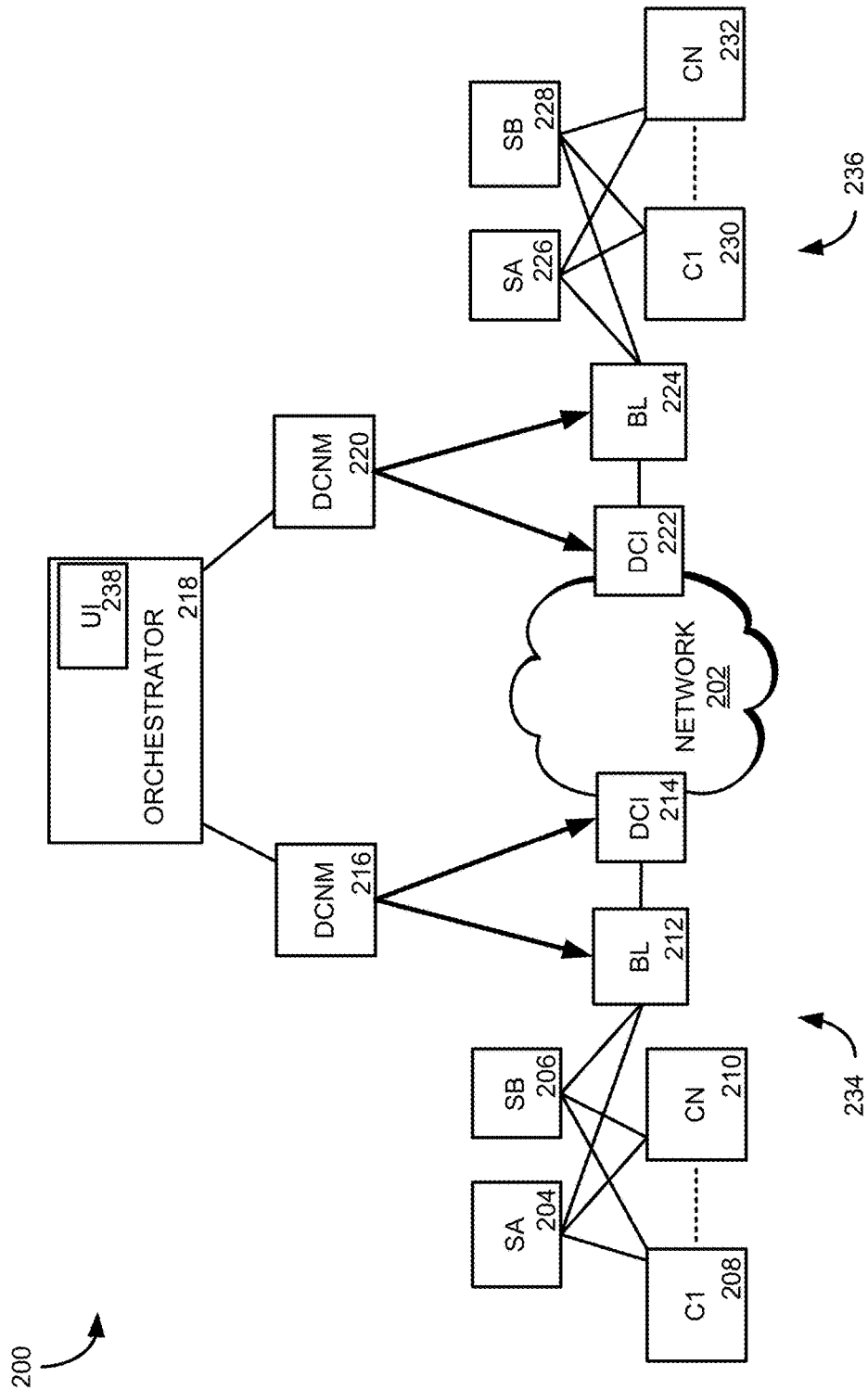
FIG. 2 is a system diagram illustrating stitching two data center networks together through a Layer 2 interconnect.

FIG. 2 is a system diagram illustrating stitching two data center networks together through a Layer 2 interconnect. Several of the components of the network 200 structure illustrated in FIG. 2 may be similar to the components of the fabric network 100 discussed above with reference to FIG. 1. Thus, a first data center network 234 may include any number of compute or storage components 208-210 in communication with one or more switches 204, 206. Similar to above, the components may be physical or virtual, as configured by a network administrator. Also included in the data center network 234 is a border leaf node 212 and a data center edge device 214 connected to a network 202. A DCNM 216 may be associated with or otherwise in communication with data center network 234 to control and configure the network components.

A second data center network 236 may also be included in the network 200 configuration. The second data center network 236 may be similar to the first data center network 222 and include compute or storage components 230-232 in communication with one or more switches 226, 228, a border leaf node 224, and a data center edge device 222 connected to the network 202. A DCNM 220 may be associated with or otherwise in communication with data center network 236 to control and configure the network components. Although illustrated as having the same general configuration as the first data center 234, it should be appreciated that data center network 236 may be in any configuration as desired by a network administrator to perform any network or compute function as a VM or VLAN. The data centers 234, 236 are presented herein as being of similar configuration for simplicity of discussion only. In general, each data center 234, 236 may include the DCNM 216, 218, an edge device 214, 222 connected to an IP network 202, and a border leaf network 214, 224.

In one implementation of the network 200, first data center network 234 and second data center network 236 may be Layer 2 interconnected such that communications between the networks may occur at Layer 2. For example, OTV provides a solution to extend Layer 2 connectivity across different sites using an existing network 202. With OTV, Layer 2 extensions across multiple data centers are achieved by configuring one or more edge devices 214, 222 at each of the data centers 234, 236 to extend a set of virtual local area networks (VLANs) across the multiple data centers. By doing so, hosts or containers within a first data center 234 can access hosts or containers within the other data center 236 using Layer 2 communications. Other transport protocols may also be utilized in IP network 202 to Layer 2 interconnect the data centers 234, 236, such as VLPS and/or Ethernet. In general, however, interconnecting the data centers 234, 236 at Layer 2 across network 202 typically requires the manual configuration of the edge devices 214, 222 (among other network devices) to map the Layer 2 transport protocol to the transport protocols of the different data centers.

In some embodiments of the network 200, an orchestrator device or component 218 is provided. In general, the orchestrator 218 provides an interface through which a network administrator may configure one or more aspects of the network 200. As such, the orchestrator may, in some implementations, be embodied in the one or each of the DCNMs 216, 220 of the network 200. The orchestrator 218 may operate on any compute or network device of the network 200 and communicates with one or more components of the network to provide instructions or otherwise configure the network. In one particular implementation, a network administrator may access a user interface 238 through which network configuration information may be provided by the administrator to configure aspects of the network 200.

Figure 3:
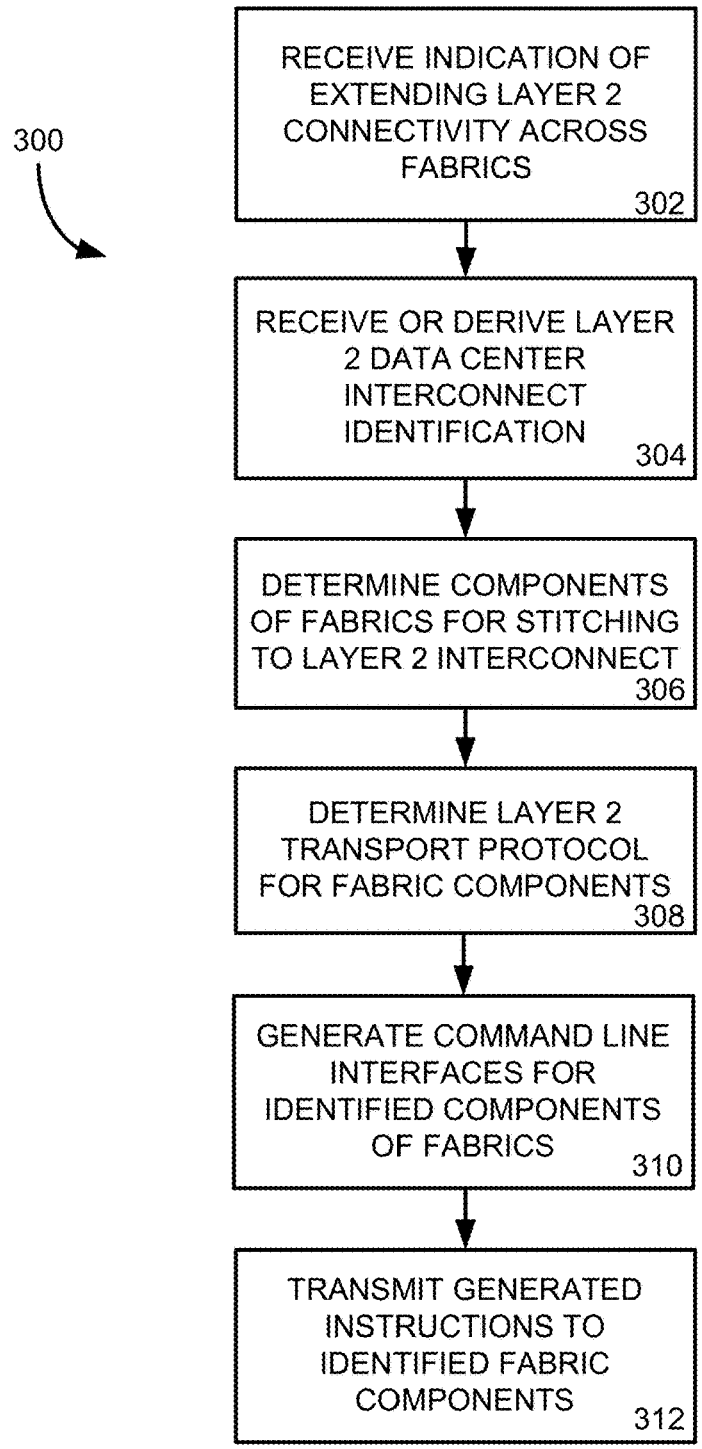
FIG. 3 is a flowchart of a method for an automated approach to stitching disparate Layer 2 domains across data center interconnects.

Operations of the orchestrator 218 are discussed in more detail below with particular reference to the flowchart of FIG. 3.

In some embodiments, orchestrator 218 defines one or more network infrastructure operational policies for container-based application deployment. Thus, the orchestrator 218 may receive network configuration information, including containers embodied or hosted within a data center network, and communicates with one or more network devices to facilitate the received configuration. In one particular embodiment, the orchestrator 218 communicates with an associated DCNM 216 to configure the network components. Other network controls, such as debugging of connections, monitoring for network issues, and altering the configuration of the network in response to inputs or performance measuring may also be controlled through the orchestrator device 218.

As mentioned above, the orchestrator 218 may also automate stitching disparate Layer 2 domains across data center interconnects without the need to renumber virtual local area networks within an existing network. In particular, FIG. 3 illustrates a flowchart of a method for an automated approach to stitching disparate Layer 2 domains across data center interconnects. In general, the orchestrator may perform one or more of the operations of the method 300. However, any component of the network 200 or associated with the network may perform the operations. Further, the operations may be executed through any number of hardware components of the network 200, software programs of the network, or a combination of hardware and software components.

Figure 4:
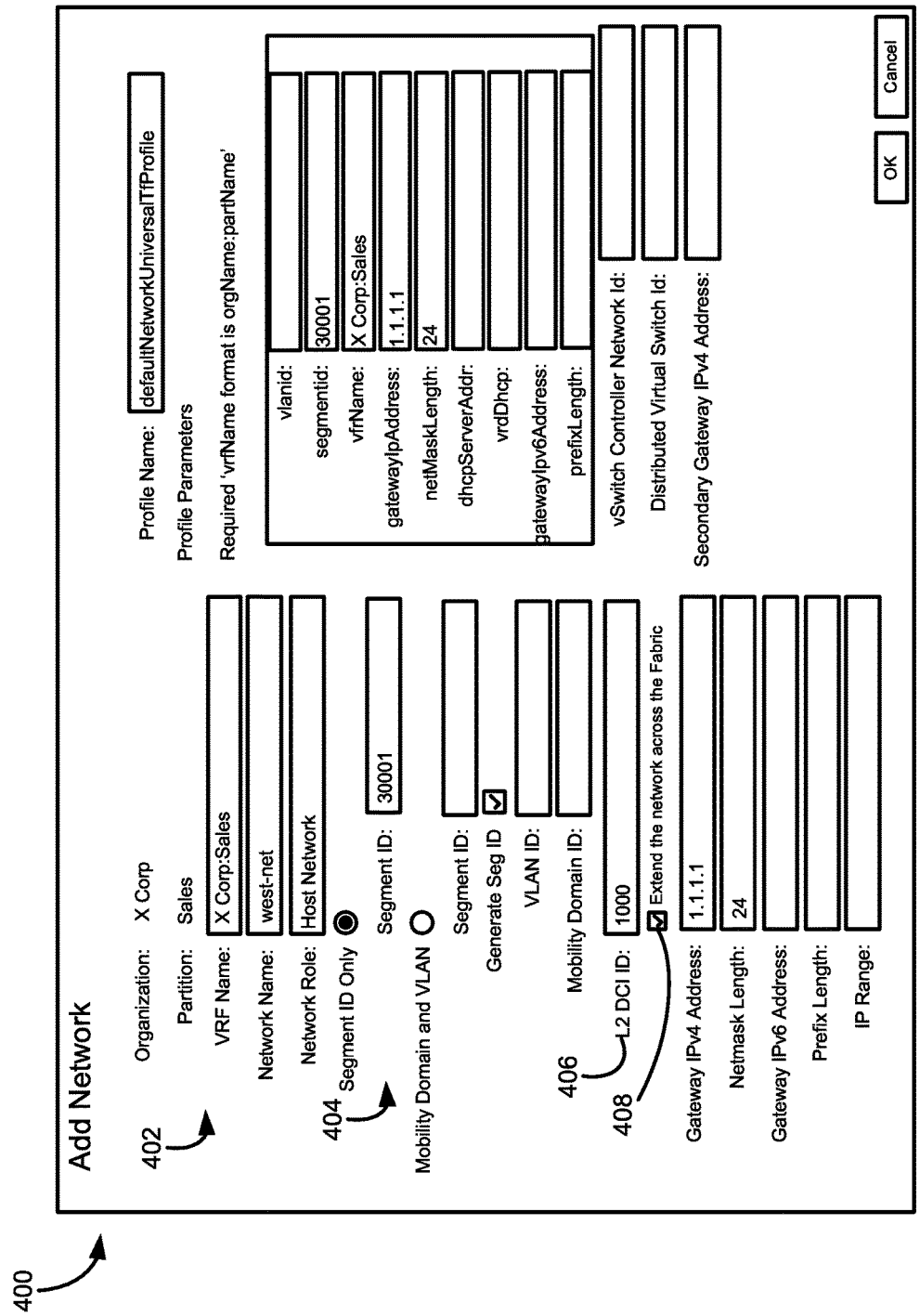
FIG. 4 is a screenshot of a user interface of an orchestrator through which a user may select to stitch disparate Layer 2 domains across data center interconnects.

Beginning in operation 302, the orchestrator 218 may receive an indication to extend a network across fabrics. The extension of a network across multiple fabrics may occur for any number of reasons, including connecting different fabrics after a business merger or acquisition and/or to expand an existing fabric into a larger network. In one particular implementation, the indication to extend a network across fabrics may be received through a user interface 238 of the orchestrator 218. FIG. 4 illustrates one such user interface 238 through which the indication to extend the network may be received. In particular, FIG. 4 is a screenshot 400 of a user interface of an orchestrator 218 through which a user may select to stitch disparate Layer 2 domains across data center interconnects. The user interface 400 is but one example of a type of interface that a user of administrator of a network may utilize to manage network components and/or network configurations.

The example user interface 400 may include several fields or other selectable portions through which network information may be presented or configured. For example, the particular user interface 400 illustrated in FIG. 4 is an interface through which a network or fabric may be added to an existing network configuration. To access the user interface 400, a network administrator may log into or otherwise access the orchestrator device 218 and select to add or create a network. In some implementations, the user interface 400 may be available through a DCNM that corresponds to a created network. The user interface 400 may include created network information 402, such as a name of the organization managing the network and a network name. In general, any aspect of the created network may be presented through the interface 400. Other routing information or numbering information 404 (such as VLAN identifiers of the network or subnet values) may also be provided through the interface 400. Such information may provide routing addresses or other values utilized by the network to route communication packets within the network.

In one particular implementation, the user interface 400 may include a portion 406, 408 through which a user of the interface may indicate that the created network is to be Layer 2 extended across a fabric. In particular, a user may select the check-box 408 to indicate that the network is to be Layer 2 extended. This selection may be received from a user of the interface 400 through a computing device and in particular through an input device to the computing device. In one example, the user utilizes a mouse click or keyboard key to select to Layer 2 extend the created network. In another implementation, the orchestrator 218 itself may select to Layer 2 extend the network across the fabric.

Also included is a field for providing or displaying a Layer 2 data center ID (DCI ID). Returning to the method 300 of FIG. 3, this Layer 2 DCI ID may be provided to the orchestrator 218 or derived by the orchestrator in operation 304. In one particular implementation, a user of the user interface 400 may provide a desired DCI ID that is used to Layer 2 stitch fabrics together. This DCI ID may thus be utilized by a network manager to Layer 2 stitch together any number of fabrics utilizing the same DCI ID that is common to all fabrics. In another implementation, the DCI ID may be derived by the orchestrator 218 in response to receiving the indication of the Layer 2 extension. For example, the orchestrator 218 may simply select a DCI ID for use by all fabrics to be stitched together and utilize that DCI ID for all related fabrics. In this example, a central database of DCI IDs utilized by an organization of network may be maintained by the system 200 from which the orchestrator 218 may retrieve the DCI ID to utilize in Layer 2 extended the fabric. In another implementation, a user may provide an alphanumeric DCI ID in the field 406 of the user interface 400 from which the orchestrator 218 may derive the Layer 2 DCI ID from a name utilizing a type of hashing scheme. In general, the orchestrator may receive or determine the DCI ID from any source or scheme.

With the DCI ID determined, the orchestrator 218 selects the network components of the fabric or data center that the Layer 2 segment will be extended over in operation 306. Utilizing the network 200 of FIG. 2, the orchestrator 218 may transmit the network information that is entered through the user interface 400 to a DCNM 216 associated with the fabric to be extended. In one particular example, the orchestrator 218 may utilize one or more APIs to pass along the network information. In another implementation, the DCNM 216 receives the network information, such as the DCI ID, from a user directly. The DCNM 216 in turn selects which components of the network 200 that are to have the Layer 2 segment extended over. In particular, the DCNM 216 identifies the border leaf nodes 212 and edge devices 214 of the fabric as those components the Layer 2 segment is extended. In general, the selected border leaf nodes 212 map the DCI ID into a VLAN of the network on the interface between the border leaf node and a connected edge device 214.

Each of the selected edge devices 214 may be, in one implementation, pre-configured with network information that will not be changed by the Layer 2 extension across the device. This information may be known or obtained by the DCNM 216 managing the particular fabric 234. Such static network information may include external neighborhood devices, multicast configuration, etc. The orchestrator 218, in turn, is responsible for per bridge domain configuration where Layer 2 extension is applied, such as VLAN translation command for OTV, and/or VPLS configurations. Some examples of static information maintained by the DCNM 216 or the orchestrator 218 may include the maximum number of VLAN extensions on the edge device 214, physical interface connection to a border leaf node 212, and which data center interconnect (DCI) technology is supported by the edge device (such as OTV, VPLS, or Ethernet).

As part of the selection of identification of the network components to be configured to Layer 2 extend the network, the DCNM 216 or orchestrator 218 may allocate a VLAN from a pool of VLAN identifiers to the border leaf node 212 and data center edge device 214 connection and configures the selected network components with the relevant network configuration information. For example, in operation 308, the orchestrator 218 or DCNM 216 determines the Layer 2 transport protocol utilized by the DCI for Layer 2 communication. Once the transport protocol is determined, the orchestrator 218 or DCNM 216 generates one or more command line interface (CLIs) or instructions for commissioning or configuring the components in operation 310 and, in operation 312, transmits those configuration instructions to the determined border leaf nodes 212 and edge devices 214. By executing the transmitted instructions, the components 212, 214 are configured to extend the Layer 2 segment ID into the network 234 such that fabrics can communicate over Layer 2 communications.

For example, assume that the edge device 214 utilizes OTV to communicate over network 202. In this circumstance, the border leaf node 212 may generate a Layer 2 configuration based on the network information received from the DCNM 216 or orchestrator 218. The configuration of the border leaf node 212 may map the Layer 2 segment ID to the VLAN associated with the fabric network 234. Further, the edge device 214 may generate an OTV configuration based on the received network information that translates border leaf node facing VLAN to OTV transport VLAN. In one particular embodiment, the OTV transport VLAN is the Layer 2 DCI ID determined above. Thus, the Layer 2 DCI ID is carried in the OTV packet from the edge device 214 to an edge device of another fabric 236 (such as edge device 222) over network 202. In this manner, the DCI ID may be utilized in the OTV packet itself to extend the Layer 2 communications between the various fabrics 234, 326 connected to the network 202.

Further, the same method 300 as described above may be executed by the orchestrator 218 on fabric 236 to configure the fabric to also communicate utilizing the DCI ID. For example, orchestrator 218 may utilize DCNM 220 to determine the components connected to the network 202, such as border leaf node 224 and edge device 222. A configuration file with relevant network information may be generated by the DCNM 220 and transmitted to the border leaf node 224 and edge device 222 for configuring the components to extend the Layer 2 segment into the fabric network 236. Because the same DCI ID is utilized by both fabrics 234, 326, however, the fabrics may utilize the DCI ID to extend Layer 2 communication between the fabrics, in some cases including the DCI ID within the OTV packet carried along the network 202.

Figure 5:
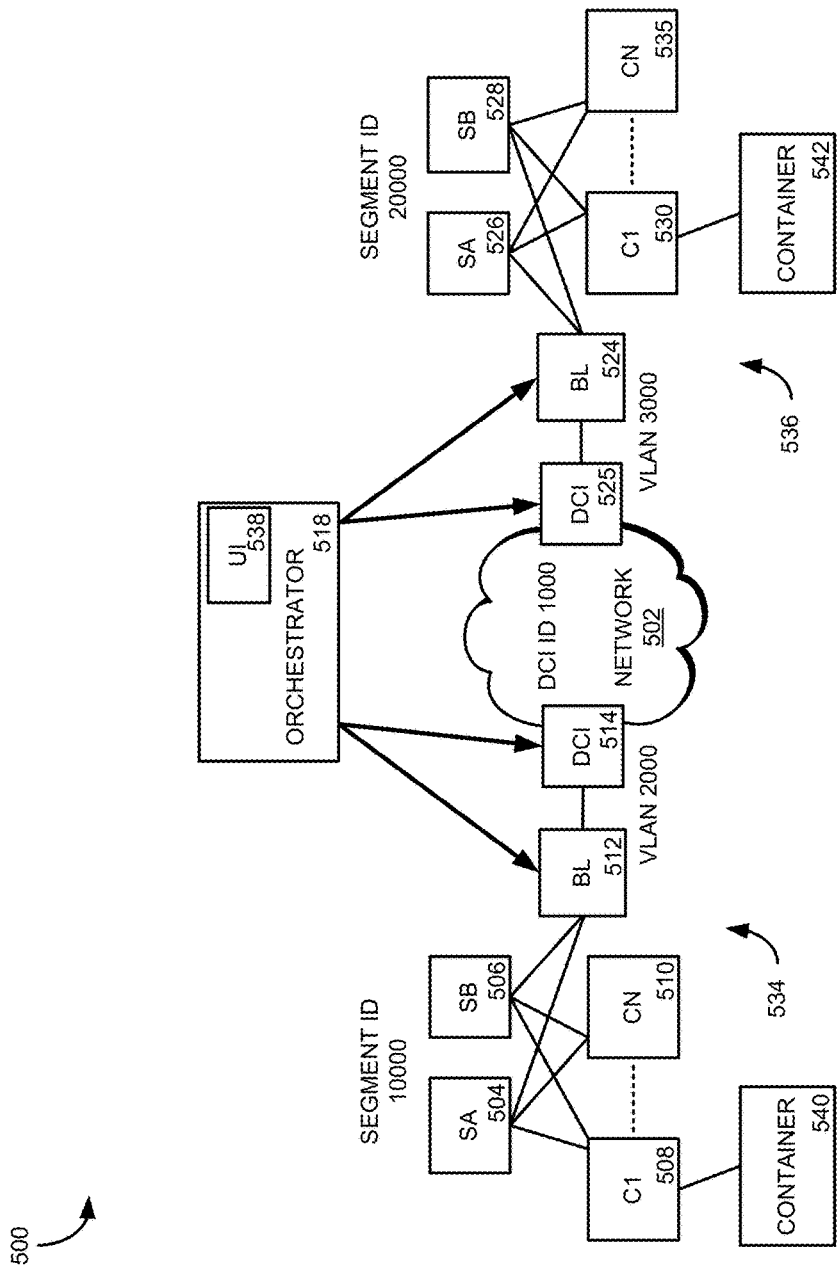
FIG. 5 is a system diagram illustrating two data center networks interconnected at Layer 2 while maintaining virtual local area networks numbering within an existing network.

Through the method 300 described above executed for both fabrics 234, 236, the two fabrics are Layer 2 interconnected via OTV. FIG. 5 is a system diagram 500 illustrating two data center networks 534, 536 interconnected at Layer 2 while maintaining virtual local area networks numbering within an existing network. In general, the network 500 illustrated in FIG. 5 is same network 200 as illustrated in FIG. 2 but with the two fabrics Layer 2 interconnected. Thus, the components of the network 500 have the same numbering scheme as the network described above. In this example, however, orchestrator 518 is illustrated as monitoring and managing the Layer 2 interconnect of the two fabric networks 234, 236.

As shown in the network 500, the configuration of the border leaf node 512 and edge device 514 extend the Layer 2 segment routing into the fabric 534. In particular, a DCI ID is utilized to extend the Layer 2 communications between the fabrics. For example, assume that fabric 534 utilizes segment ID value of 10000 to exchange communications. A container or host 540 connected to the fabric network 534 utilizes the segment ID 10000 to transmit communications between the components of the network. Further, suppose border leaf node 512 and edge device 514 utilize VLAN identifier 2000 to exchange communications. Similarly, fabric 536 may utilize segment ID 20000 between the components of the fabric and VLAN 3000 for communications between edge device 522 and border leaf node 524. Thus, each fabric 534, 536 utilizes a VLAN/segment ID communication scheme. To transmit communications between the fabrics 534, 536 over network 502, the network 500 may utilize an OTV transport protocol.

Through the mechanisms and methods described above, the orchestrator 518 may initiate or establish a DCI ID to stitch the two fabrics 534, 536 together through the common DCI ID. In particular, the Layer 2 DCI ID may be used as the OTV transport VLAN as illustrated through orchestrator 518 mapping OTV VLAN 2000 to DCI ID 1000 at edge device 514 and border leaf node 512 and mapping OTV VLAN 3000 to DCI ID 1000 at edge device 522 and border leaf node 524. As such, the DCI ID 1000 is utilized to extend Layer 2 connectivity between container 540 in fabric 534 to container 542 of fabric 536. Further, this extension of the Layer 2 communication between the fabrics 534, 536 occurs automatically through the use of the orchestrator 518 to coordinate and execute the mapping of the DCI ID to the OTV transport VLAN without needing a network administrator to manually configure the components of the fabrics to communicate utilizing the DCI ID. In this manner, the stitching together of fabric networks 534, 536 over the network 502 may be executed by the orchestrator 518, thereby simplifying and improving the efficiency of the network configuration.

The above description provides for an automated mechanism for Layer 2 stitching together of fabric networks that utilize OTV as the Layer 2 interconnect technology or protocol. However, the same mechanism and methods may also be applied to VPLS, another widely used Layer 2 interconnect technique. When VPLS is used to interconnect data centers, the Layer 2 DCI ID is used as the VPLS VPN ID/VC ID in a similar manner as the DCI ID is used as the OTV transport VLAN. Thus, the affected edge devices 514, 522 and border leaf nodes 512, 524 of the connecting fabrics 534, 536 may be configured by the orchestrator 518 to utilize the DCI ID as the VPLS VPN ID such that the fabrics may Layer 2 communicate.

In one particular example, the edge devices 514, 522 of the network 500 may be configured with VPLS Border Gateway Protocol (BGP) based auto discovery as part of the device configuration. VPLS auto discovery allows the edge devices 514, 522 to discover other edge devices that are part of the same VPLS domain. When a network is created, the network configuration profile specific to the VPLS is pushed to the edge devices 514, 522, using the Layer 2 DCI ID as the VPLS VPN ID to provide for the Layer 2 communication between the edge devices utilizing the received Layer 2 DCI ID.

In this manner, the DCI ID may be used regardless of the Layer 2 transport protocol used such that the DCI ID is transport agnostic or otherwise provides a normalizing identification number for Layer 2 communications between fabrics. This further improves the operation of configuration the network by removing the need for a network administrator to know the transport protocol for each fabric being added to an existing network. Rather, the orchestrator 518 or administrator may simply utilize the same DCI ID across all fabrics to be interconnected and the configuration of the network components occurs automatically through the operation of the orchestrator.

Figure 6:
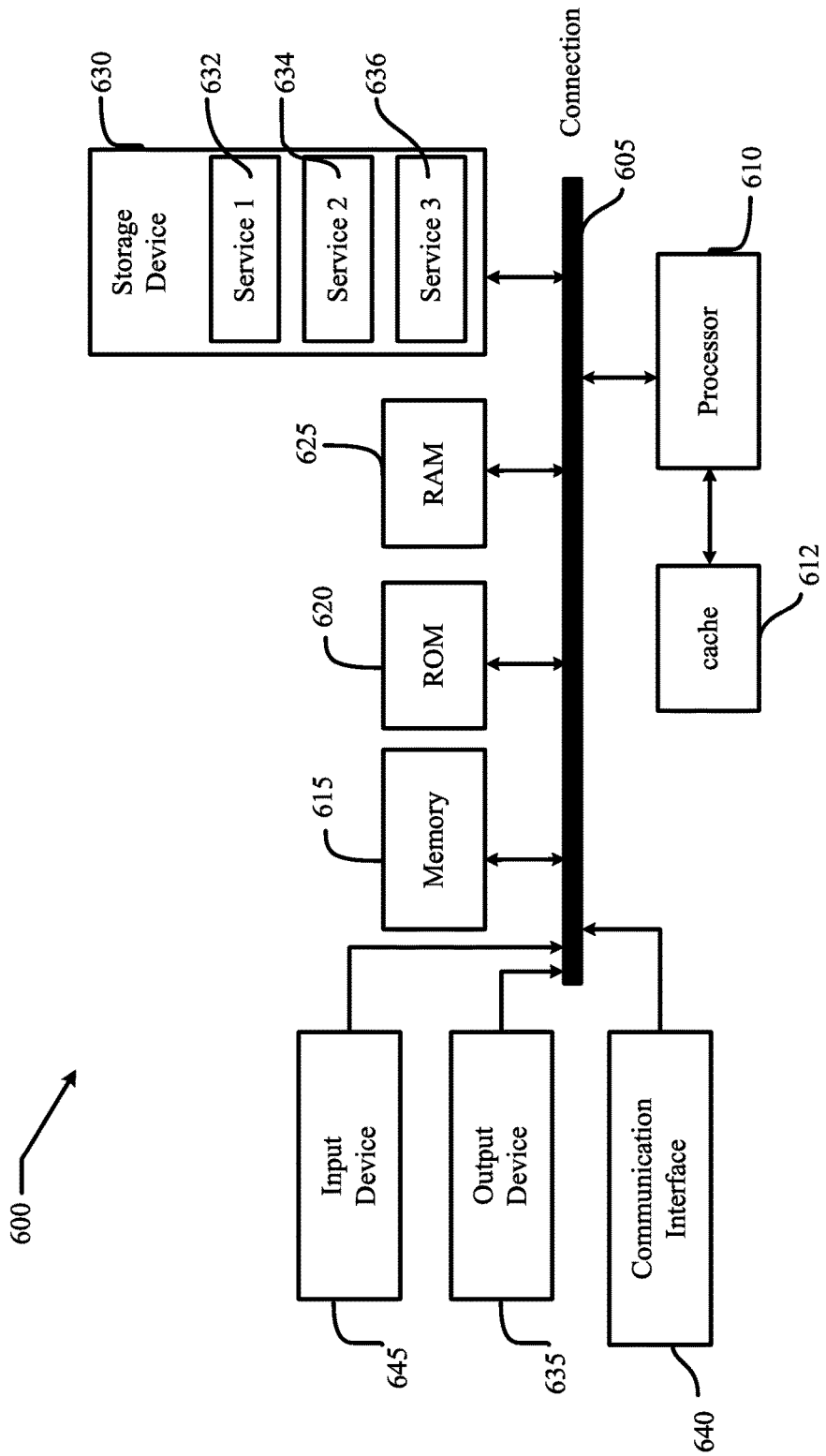
FIG. 6 shows an example system embodiment.

FIG. 6 shows an example of computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple datacenters, a peer network, etc. In some embodiments, one or more of the described system components represents many such components, each performing some or all of the function for which the component is described. In some embodiments, the components can be physical or virtual devices.

Example system 600 includes at least one processing unit (CPU or processor) 610 and connection 605 that couples various system components, including system memory 615, such as read only memory (ROM) and random access memory (RAM), to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a portable device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for extending a Layer 2 network between two or more fabric networks, the method comprising:
   receiving a request to connect a first fabric network to a second fabric network over a network through a Layer 2 interconnect, wherein the first fabric network utilizes a first Virtual Local Area Network (VLAN) identifier and the second fabric network utilizing a second VLAN identifier different than the first VLAN identifier;
   obtaining a Data Center Interconnect (DCI) identifier that identifies an interconnection between the first fabric network and the second fabric network;
   automatically generating, in response to the receiving, a first configuration profile to at least one border networking device of the first fabric network based on the received request, the first configuration profile to configure the at least one border networking device of the first fabric network to map the DCI identifier to the first VLAN identifier and to include the DCI identifier in a Layer 2 transmission protocol portion of a first plurality of communication packets intended for the second fabric network; and
   automatically generating, in response to the receiving, a second configuration profile to at least one border networking device of the second fabric network to configure the at least one border networking device of the second fabric network to map the DCI identifier to the second VLAN identifier and to include the DCI identifier in a Layer 2 transmission protocol portion of a second plurality of communication packets intended for the first fabric network.

2. The method of claim 1 wherein the Layer 2 transmission protocol is an Overlay Transport Virtualization (OTV) protocol and the DCI identifier is included in an OTV packet from the first fabric network to the second fabric network.

3. The method of claim 2 wherein the DCI identifier is utilized as an OTV transport VLAN and included in a data plane of the OTV packet.

4. The method of claim 1 wherein the Layer 2 transmission protocol is a Virtual Private Local Area Network (LAN) Service (VPLS) transport protocol and the DCI identifier is utilized as a VPLS Virtual Private Network (VPN) identifier in a data plane of a VPLS VPN packet.

5. The method of claim 1 wherein the DCI identifier is obtained from an input provided through a user interface executed on an orchestrator device in communication with the first fabric network and the second fabric network.

6. The method of claim 1 wherein the DCI identifier is obtained from a central database storing a plurality of DCI identifiers, each of the plurality of DCI identifiers associated with a corresponding data center interconnect.

7. The method of claim 1 wherein the at least one border networking device of the first fabric network comprises a first data center interconnect edge device and a first border leaf node and the at least one border networking device of the second fabric network comprises a second data center interconnect edge device and a second border leaf node, wherein the first data center interconnect edge device and the second data center interconnect edge device are in communication with a telecommunications network.

8. The method of claim 1 further comprising:
   generating the first configuration file at a first data center network manager in communication with the at least one border networking device of the first fabric network based on one or more instructions from an orchestrator device.

9. The method of claim 8 further comprising:
   generating the second configuration file at a second data center network manager in communication with the at least one border networking device of the second fabric network based on one or more instructions from the orchestrator device.

10. A networking device comprising:
    at least one communication port for communication with at least one device of a data center network;
    a processing device; and
    a computer-readable medium connected to the processing device configured to store information and instructions that, when executed by the processing device, performs the operations of:
      receiving a request to connect a first fabric network to a second fabric network over a network through a Layer 2 interconnect utilizing a Data Center Interconnect (DCI) identifier that identifies an interconnection between the first fabric network and the second fabric network;
      generating, in response to the receiving, a first plurality of instructions to a first data center network manager (DCNM) to create a first configuration profile for at least one border networking device of the first fabric network, the first configuration profile configuring the at least one border networking device of the first fabric network to map the DCI identifier to a first VLAN identifier of the first fabric network and to include the DCI identifier in a Layer 2 transmission protocol portion of a first plurality of communication packets intended for the second fabric network; and
      generating, in response to the receiving, a second plurality of instructions to a second DCNM to create a second configuration profile for at least one border networking device of the second fabric network, the second configuration profile configuring the at least one border networking device of the second fabric network to map the DCI identifier to a second VLAN identifier of the second fabric network different than the first VLAN identifier and to include the DCI identifier in a Layer 2 transmission protocol portion of a second plurality of communication packets intended for the first fabric network.

11. The network device of claim 10 wherein the Layer 2 transmission protocol is an Overlay Transport Virtualization (OTV) protocol and the DCI identifier is included in an OTV packet from the first fabric network to the second fabric network.

12. The network device of claim 11 wherein the DCI identifier is utilized as an OTV transport VLAN and included in a data plane of the OTV packet.

13. The network device of claim 10 wherein the Layer 2 transmission protocol is a Virtual Private Local Area Network (LAN) Service (VPLS) transport protocol and the DCI identifier is utilized as an VPLS Virtual Private Network (VPN) identifier in a data plane of a VPLS VPN packet.

14. The network device of claim 10 wherein the instructions further cause the processing device to perform the operations of:
displaying a user interface on a display device connected to the network device, wherein the DCI identifier is obtained from an input provided through the user interface.

15. The network device of claim 14 wherein receiving the request to connect the first fabric network to the second fabric network over a network through the Layer 2 interconnect is received through the user interface.

16. The network device of claim 15 wherein the user interface displays network information of the first fabric network and the second fabric network.

17. The network device of claim 10 wherein the instructions further cause the processing device to perform the operations of:
accessing a central database storing a plurality of DCI identifiers to obtain the DCI identifier, each of the plurality of DCI identifiers in the central database associated with a corresponding data center interconnect.

18. The network device of claim 10 wherein generating the first plurality of instructions to the first DCNM to create the first configuration profile for at least one border networking device of the first fabric network comprises accessing at least one Application Programming Interface (API) for communicating with the first DCNM.

19. The network device of claim 10 wherein the Layer 2 transmission protocol is Ethernet.

20. A non-transitory computer readable media comprising computer executable instructions which when executed by a processor cause the processor to perform operations comprising:
receiving a request to connect a first fabric network to a second fabric network over a network through a Layer 2 interconnect, wherein the first data center utilizes a first Virtual Local Area Network (VLAN) identifier and the second data center utilizing a second VLAN identifier different than the first VLAN identifier;
obtaining a Data Center Interconnect (DCI) identifier, the DCI identifier that identifies an interconnection between the first fabric network and the second fabric network;
automatically generating, in response to the receiving, a first configuration profile to at least one border networking device of the first fabric network based on the received request, the first configuration profile to configure the at least one border networking device of the first fabric network to map the DCI identifier to the first VLAN identifier and to include the DCI identifier in a Layer 2 transmission protocol portion of a first plurality of communication packets intended for the second fabric network; and
automatically generating, in response to the receiving, a second configuration profile to at least one border networking device of the second fabric network to configure the at least one border networking device of the second fabric network to map the DCI identifier to the second VLAN identifier and to include the DCI identifier in a Layer 2 transmission protocol portion of a second plurality of communication packets intended for the first fabric network.

* * * * *